United States Patent [19]

Oka

[11] 3,865,663
[45] Feb. 11, 1975

[54] PATTERNED RUBBER ARTICLE AND A PROCESS FOR MAKING THE SAME
[75] Inventor: Takeshi Oka, Tokyo, Japan
[73] Assignee: Bridgestone Tire Company Limited, Tokyo, Japan
[22] Filed: May 21, 1973
[21] Appl. No.: 362,079

Related U.S. Application Data
[63] Continuation of Ser. No. 132,287, April 8, 1971, abandoned.

[30] Foreign Application Priority Data
Apr. 11, 1970  Japan.............................. 45-30523
Apr. 11, 1970  Japan.............................. 45-30501
Apr. 11, 1970  Japan.............................. 45-30524

[52] U.S. Cl........... 156/116, 152/353, 152/DIG. 12, 156/128 R, 156/244, 156/281, 156/394
[51] Int. Cl.................................... B29h 21/02
[58] Field of Search............. 156/63, 110, 116, 123, 156/126–129, 237, 239, 240, 244, 277, 281, 299, 300, 313, 383, 384; 161/5, 6, 97, 138; 152/DIG. 12, 330, 353

[56] References Cited
UNITED STATES PATENTS
2,136,567  11/1938  Smith................................. 156/116
2,231,083  2/1941  Moody et al....................... 156/237
2,979,099  4/1961  Rowe................................. 156/116
2,985,216  5/1961  Williams et al.................... 156/277
3,607,498  9/1971  Kubota.............................. 156/116
3,623,900  11/1971  Stillwater et al................... 156/116

FOREIGN PATENTS OR APPLICATIONS
460,557  1/1937  Great Britain..................... 156/116

Primary Examiner—Clifton B. Cosby
Assistant Examiner—John E. Kittle
Attorney, Agent, or Firm—Waters, Roditi, Schwartz & Nissen

[57] ABSTRACT

A process for making a patterned rubber article, by overlaying a transparent unvulcanized thin rubber film on a semi-finished rubber body, painting a desired pattern on the surface of the body or on the body-facing surface of the rubber film, the pattern being drawn by a paint containing a vehicle enhancing the adhesion of the paint to the rubber body, and thereafter vulcanizing the rubber body together with the rubber film.

1 Claim, 4 Drawing Figures

# PATTERNED RUBBER ARTICLE AND A PROCESS FOR MAKING THE SAME

CROSS RELATED APPLICATION

This application is a continuation of copending application Ser. No. 132,287 filed Apr. 8, 1971, now abandoned, and claiming the priority of the applications filed in Japan on Apr. 11, 1970, (30523/70, 30524/70, and 34501/70).

This invention relates to a patterned rubber article and a process for making the same, and more particularly, to a decorative or indicative rubber article having monochromatic or polychromatic (or multichromatic) marks or patterns applied thereon and a process for making such rubber article.

In order to make an attractive rubber article, it has been to practice heretofore to apply a colored pattern on the rubber article. Such colored pattern is usually made by putting it on the article prior to vulcanization and completing the article by vulcanizing the article together with the pattern thus put thereon. Such conventional practice is useful only for those articles whose shape is not significantly changed by the vulcanization after putting the pattern thereon. In the case of pneumatic tires for vehicles, however, the vulcanizing process is also intended for shaping, and the tire shape is vastly changed after the vulcanization. Accordingly, if any desired pattern is put on the pneumatic tire prior to the vulcanizing process, such pattern will be substantially deformed by the vulcanization. In addition to the change in the shape, the coloring of the pattern applied prior to the vulcanization is likely to be altered thereby, so that after the vulcanization, the patterns are often blurred.

To obviate such difficulties, in manufacturing automobile or bicycle pneumatic tires with marks or patterns applied on the side surfaces thereof, it has been the practice to overlay a colored rubber sheet on a green tire during the shaping or tread extruding process. After the green tire is vulcanized by using a metallic mold having desired patterns engraved thereon, the colored rubber is exposed by partially removing protruding portions of the vulcanized tire with a grinder or other suitable cutter. Such known process of making patterns on the surface of pneumatic tires have the following shortcomings.

1. Extra work is necessary to overlay one or more colored rubber sheets on the green tire in the course of shaping it.
2. The entire process is complicated and rather inefficient.
3. The number of colors usable in the pattern is limited.
4. Different metal molds are necessary for different patterns and hence, the process is rather costly.
5. Only simple patterns can be formed on the pneumatic tires, because the engraving of metallic molds is difficult and costly.
6. It is necessaray to partially remove the tire side surfaces after the vulcanization.

Japanese Utility Model No. 413,388 discloses a tire consisting of a carcass having colored side portions and transparent side wall rubbers overlaid thereon. The tire of this Japanese utility model, however, has never been manufactured on an industrial scale for the following reasons.

i. It is difficult to apply complicated patterns on the rough surface of a carcass and to accurately color such patterns on the carcass.
ii. To make such tires, the side wall portions of the carcass must be painted either before tire shaping or during the tire shaping, prior to the application of the transparent side wall rubber thereon. There is difficulty in painting patterns on the carcass surface before the tire shaping, due to the fact that in the process of tire shaping the warps of different carcass plies are so arranged as to obliquely intersect each other. If patterns are painted prior to the shaping, the tire shaping process must be carried out without disturbing such patterns, so that it becomes extremely complicated and time-consuming.

This also makes the painting of complicated patterns difficult. The painting during the tire shaping is also difficult, because of the special shape of the unvulcanized green tire, and such painting during the shaping is prohibitively inefficient.
iii. From the standpoint of mechanical strength of the pneumatic tire, the transparent side wall rubber must be thicker than a certain minimum thickness. Due to such thickness requirement, the transparency of the side wall rubber is limited, so that the accuracy of the patterns or hue of the coloring on the carcass surface cannot fully be appreciated because of the presence of the side wall rubber.

Therefore, an object of the present invention is to obviate the aforesaid difficulties of conventional patterned rubber articles by providing a process for making a rubber article, e.g., a pneumatic tire, having a complicated pattern with attractive coloring.

This invention relates to a process for manufacturing a rubber article whose size in the unvalcanized semi-processed condition is considerably different from that of the vulcanized finished product, such as a tire and particularly to a process for applying colored marks to the tire, characterized by sticking a substantially transparent film of unvulcanized rubber on the unvulcanized article, with desired marks applied in mono- or multichrome between the inner surface of said film and the outer surface of said article by means of a paint containing as a vehicle a material having high adhesion to the unvulcanized article, and subjecting the assembly to vulcanization together in a vulcanizing mold.

The salient features of the process for making a patterned rubber article, according to the present invention, are as follows.

a. Since the painted surface is protected from direct contact with the surface of metallic molds, the danger of blurring and deformation of the painted pattern during vulcanization is completely eliminated.
b. After the vulcanization, the pattern on the finished rubber article is covered by the thin rubber film, which is substantially transparent, so that the pattern, either monochromatic or polychromatic, is protected from oxygen in the outside air, from ultraviolet rays and from mechanical scratching or shocks.

Accordingly, the monochromatic or polychromatic pattern lasts substantially without any aging.
c. As compared with conventional methods using colored rubbers for making the desired pattern, the use of vehicle-containing paints in the process of the present invention ensures substantially free selection of the pattern and its coloring.

d. Since metallic molds to be used in the process of the invention are not engraved for making patterns, one metal mold can be used for vulcanizing various articles, regardless of the patterns to be formed on the articles.

e. The need for a finishing process by partial removal of protruding portions is completely eliminated.

The semi-finished rubber article, which is to be used in the present invention, consists mainly of natural rubber and/or synthetic rubber, and it may contain a suitable optional reinforcing material.

The transparent unvulcanized thin rubber film, which is to be used in the process of the present invention, should be so transparent that the coloring and pattern on the outer surface of the rubber body of the article can be seen from the outside through such thin rubber film even after the vulcanization. The thin rubber film is also required to be vulcanizable together with the semi-finished rubber body of the article. The thickness of the thin rubber film is less than 1 mm, preferably less than 0.3 mm for providing the desirable high transparency. The unvulcanized thin rubber film is overlaid on the rubber article either in a completely unvulcanized state or in a semi-cured state. The thin rubber film can be in the semi-cured state either before the coloring thereon or after it. The so-called semi-cured state can be achieved by halting preliminary vulcanization before the rubber composition in the thin rubber film completes its intermolecular bridging reaction.

The material suitable for the unvulcanized thin rubber film is for instance, natural rubber, styrene butadiene rubber, butadiene rubber, ethylene propylene terpolymer rubber, synthesized isoprene rubber, or transparent rubber mainly consisting of a mixture thereof.

Any paint can be used for applying the desired patterns in the process according to the present invention, provided that the paint contains a vehicle made of rubber or synthetic resin, said vehicle being highly adhesive to the aforesaid rubber body, while color of the paint is not changed by the vulcanizing process.

The formation of the desired pattern on either the outer surface of the rubber body or the surface of the thin rubber film facing the body can be effected either manually or by a conventional printing process. As regards the application of the pattern, the process according to the present invention includes the steps in which marks or patterns are painted on a transparent or opaque unvulcanized rubber layer, and the unvulcanized layer is applied on the outer surface of a green rubber body so as to expose the painted surface thereof, so that a transparent unvulcanized thin rubber film will be formed thereon after the succeeding vulcanization in a metallic mold.

The vulcanization in the process according to the present invention is preferably carried out in a metallic mold, and a suitable rubber surface lubricant may be used. The lubricant should not have any adverse effects on the transparency of the thin rubber film.

Other objects and advantages of the present invention may be appreciated by referring to the following description, taken in conjunction with the accompanying drawings, in which.

Figure 1:
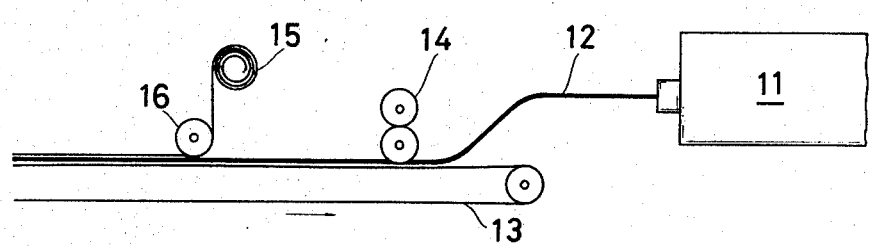
FIG. 1 is a diagrammatic illustration of a tire tread extruding process embodying the present invention.

Referring to FIG. 1, according to the present invention, a patterned rubber article can be manufactured by painting desired letters, marks, or patterns in color directly on the surface of a green unvulcanized rubber body with a paint containing a vehicle made of rubber or synthetic resin; overlaying a transparent unvulcanized thin rubber film on the rubber body so as to cover its painted surface, said thin rubber film being vulcanizable together with the rubber body; and vulcanizing the body together with the pattern and the thin rubber film in a metallic mold.

A tread extruder 11 delivers a tread 12, as it is being extruded, toward a printer roll means 14, where patterns are painted on side portions of the tread by using as a rubber paint BUDOLAQUE (an alkyd resin-rubber graft copolymer). A 0.2mm thick unvulcanized rubber film 15 is overlaid on the side portions of the tread thus painted by a roll means 16. The thin rubber film consists of 50 parts by weight of synthesized isoprene rubber, 50 parts by weight of stereo styrene butadiene rubber, 1 part by weight of stearic acid, 0.5 parts by weight of zinc oxide, 1.6 parts by weight of an accelerator, and 2.5 parts by weight of sulfur. The green tread thus formed is shaped by a conventional method, and vulcanized in a metallic mold at 150°C for 10 minutes. Thus, a bicycle pneumatic tire having a polychromatic delicate pattern on its side portions can be manufactured.

The tire made by the invention proved to have highly lustrous smooth side portions where a polychromatic delicate pattern was clearly shown. There was neither deformation nor distortion of the pattern in the tire.

Figure 2:
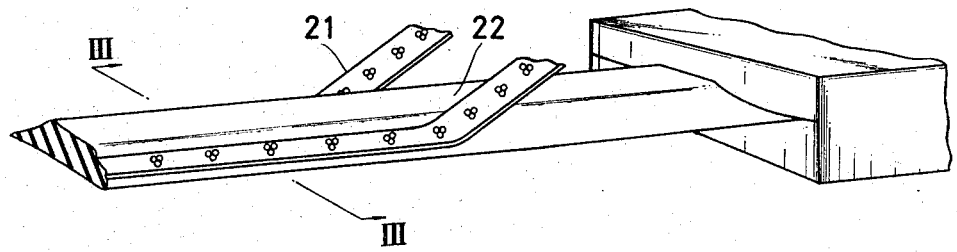
FIG. 2 is a diagrammatic illustration of another tire tread extruding process embodying the present invention.
Figure 3:
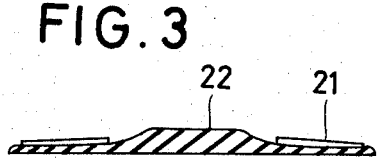
FIG. 3 is a sectional view, taken along the line III—III of FIG. 2.

In another embodiment of the present invention, as illustrated in FIGS. 2 and 3, a patterned rubber article can be manufactured by manually painting or mechanically printing desired marks or patterns on a transparent unvulcanized thin rubber film by using a paint or paints containing a vehicle made of either rubber or synthetic resin, said thin rubber film being vulcanizable together with a rubber article; applying the thin rubber film on the rubber article to cover the side thus painted or printed; and vulcanizing the rubber body together with the thin rubber film.

Referring to FIG. 2, a 0.2 mm thick transparent unvulcanized thin rubber film 21 was prepared, which consisted of 50 parts by weight of synthesized isoprene rubber, 50 parts by weight of stereo styrene butadiene rubber, 1 part by weight of stearic acid, 0.5 parts by weight of zinc oxide, 1.6 parts by weight of an accelerator, and 2.5 parts by weight of sulfur. The desired patterns were applied to the thin rubber film 21 by using rubber as a paint BUDOLAQUE (an alkyd resin-rubber graft copolymer). The thin rubber film 21 was then adhered to the surface 22 of a rubber body extruded by a tire tread extruder, with the patterns of the film 21 applied to the outer surface 22 of the rubber body. After being shaped by a suitable conventional method, the rubber body was vulcanized together with the thin rubber film 21 in a metallic mold at 150°C for 10 minutes. Thus, a bicycle pneumatic tire having polychromatic delicate patterns on its side portions was manufactured. FIG. 3 shows a sectional view of the pneumatic tire thus manufactured, in a flattened state. The tire's side portions were highly lustrous and very smooth, and the polychromatic delicate patterns could clearly be seen through the thin rubber film 21. There was neither deformation nor distoration in the patterns.

According to another embodiment of the invention, a patterned rubber article can be manufactured by painting desired letters, marks, or patterns on a transparent or opaque unvulcanized rubber layer, overlaying the rubber layer on a rubber body with the surface thus painted facing to the outside; adhering a transparent unvulcanized thin rubber film on the rubber layer; and vulcanizing the rubber body together with the rubber layer and the thin rubber film in a metallic mold.

Figure 4:
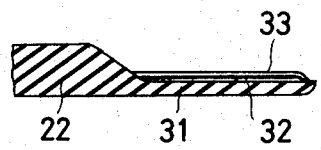
FIG. 4 is a partial sectional view of a tire tread, according to the present invention.

Referring to FIG. 4, an unvulcanized rubber layer 32 was secured to the side wall portion 31 of a rubber body delivered from a tire tread extruder, after a desired pattern was painted on the outer surface of the rubber layer 32 by the same rubber paint as the preceding embodiment. The painted surface of the rubber layer 32 was directed outwardly. A transparent unvulcanized thin rubber layer 33, which was the same as in the preceding embodiment, was overlaid on the painted surface of the rubber layer 32. Thereafter, the rubber body was vulcanized, together with the rubber layer 32 and the rubber film 33, in a metallic mold at 150°C for 10 minutes. Thus, a bicycle pneumatic tire having polychromatic delicate patterns formed on its side portions was manufactured. This tire's side portions were highly lustrous and very smooth, and the polychromatic delicate patterns could clearly be seen through the thin rubber film 33. There was neither deformation nor distortion in the patterns.

Although the present invention has been described with a certain degree of particularity, it is understood that the present disclosure has been made only by way of example and numerous changes in the details of construction and combination and arrangement of parts may be resorted to without departing from the spirit and the scope of the invention as hereinafter claimed.

I claim:

1. A process for manufacturing a tire having colored marks on the side wall portions thereof comprising
    a. applying the colored marks as rubber paint on one side of a substantially transparent film of a thickness not exceeding 1.0 mm and made of unvulcanized synthetic rubber, unvulcanized natural rubber or a combination thereof,
    b. directly contacting the thus marked side of the transparent film with the surface of the side wall portions of a tread rubber strip extruded by a tire tread extruder,
    c. forming a semiprocessed tire by using said tread rubber strip with said transparent film having said colored marks directly contacted thereon and
    d. vulcanizing the assembly in a vulcanizing mold to form the tire.

* * * * *